US008644151B2

(12) United States Patent
Foschiano

(10) Patent No.: US 8,644,151 B2
(45) Date of Patent: Feb. 4, 2014

(54) PROCESSING PACKET FLOWS

(75) Inventor: Marco Foschiano, Turin (IT)

(73) Assignee: Cisco Technology, Inc., San Jose, CA (US)

( * ) Notice: Subject to any disclaimer, the term of this patent is extended or adjusted under 35 U.S.C. 154(b) by 343 days.

(21) Appl. No.: 11/805,308

(22) Filed: May 22, 2007

(65) Prior Publication Data

US 2008/0291915 A1 Nov. 27, 2008

(51) Int. Cl.
*G01R 31/08* (2006.01)
*G06F 11/00* (2006.01)
*G08C 15/00* (2006.01)
*H04J 1/16* (2006.01)
*H04J 3/14* (2006.01)
*H04L 1/00* (2006.01)
*H04L 12/26* (2006.01)
*H04L 12/28* (2006.01)
*H04L 12/56* (2011.01)

(52) U.S. Cl.
USPC ............................. 370/232; 370/252; 370/392

(58) Field of Classification Search
None
See application file for complete search history.

(56) References Cited

U.S. PATENT DOCUMENTS

| 6,308,148 | B1 | 10/2001 | Bruins et al. |
| 6,789,203 | B1 * | 9/2004 | Belissent ........................ 726/22 |
| 6,889,181 | B2 | 5/2005 | Kerr et al. |
| 7,193,968 | B1 | 3/2007 | Kapoor et al. |
| 7,385,924 | B1 * | 6/2008 | Riddle ........................... 370/235 |
| 7,738,465 | B2 * | 6/2010 | Akahane et al. ............. 370/395.3 |
| 7,787,442 | B2 * | 8/2010 | Akahane et al. ............... 370/352 |
| 2001/0004254 | A1 * | 6/2001 | Okahara et al. ................ 345/157 |
| 2002/0163926 | A1 | 11/2002 | Moharram |
| 2005/0013300 | A1 * | 1/2005 | Akahane et al. ............ 370/395.3 |
| 2005/0039104 | A1 * | 2/2005 | Shah et al. ...................... 714/776 |
| 2005/0210533 | A1 * | 9/2005 | Copeland et al. ................ 726/23 |
| 2005/0276230 | A1 * | 12/2005 | Akahane et al. ............... 370/252 |
| 2006/0083256 | A1 * | 4/2006 | Mitchell ........................ 370/432 |
| 2007/0019548 | A1 * | 1/2007 | Krishnamurthy ............. 370/232 |

(Continued)

FOREIGN PATENT DOCUMENTS

| EP | 1 650 896 | 4/2006 |
| EP | 1 746 768 | 1/2007 |
| WO | WO 02/01834 | 1/2002 |
| WO | WO 02/01834 A2 | 1/2002 |

OTHER PUBLICATIONS

Anonymous, "ProCurve Networking Connection-Rate Filtering Based on Virus Throttling Technology," Technical Brief, published by Hewlett-Packard Company, Palo Alto, California, Dec. 2006, 11 pages.

(Continued)

*Primary Examiner* — Suk Jin Kang
(74) *Attorney, Agent, or Firm* — Hickman Palermo Truong Becker Bingham Wong LLP

(57) ABSTRACT

In one embodiment, an apparatus comprises a first logic configured to determine an identifier associated with a packet and determine a flow count index associated with the identifier, and a flow counter, coupled to the first logic and configured to count a number of packet flows associated with the flow count index. The embodiment also includes a second logic, coupled to the first logic and the flow counter, wherein the second logic is configured analyze the packet to determine if the packet is a part of a new packet flow that has not been counting in the flow counter, and if it has not been counted, incrementing the flow counter.

25 Claims, 7 Drawing Sheets

(56) References Cited

U.S. PATENT DOCUMENTS

| | | | |
|---|---|---|---|
| 2007/0076606 A1* | 4/2007 | Olesinski et al. | 370/230 |
| 2007/0115850 A1* | 5/2007 | Tsuchiya et al. | 370/252 |
| 2007/0180526 A1* | 8/2007 | Copeland, III | 726/23 |
| 2007/0209068 A1* | 9/2007 | Ansari et al. | 726/13 |
| 2007/0271374 A1* | 11/2007 | Shomura et al. | 709/224 |
| 2008/0028467 A1* | 1/2008 | Kommareddy et al. | 726/23 |

OTHER PUBLICATIONS

Anonymous, "Introduction to Cisco Ios NetFlow," Technical Overview, published by Cisco Systems, Inc., San Jose, California, Oct. 2007, 17 pages.
International Search Report and Written Opinion of International Searching Authority, PCT/US2008/064300, dated Dec. 22, 2008 (14 pgs).
Current claims, PCT/US2008/064300.
EP patent application No. 08756006.6-1249, EP Office Action, dated Sep. 13, 2010, 7 pages.
EP patent application No. 08756006.6-1249, EP Current Claims, 3 pages.
European Patent Office, Office Action in patent application No. 08756006.6-1249, dated Jun. 9, 2011, 4 pages.
Current Claims in application No. 08756006.6-1249, 3 pages, dated Jun. 2011.
European Patent Office, EP Office Action received in International Application No. 08756006.6 dated May 8, 2012 (4 pages).
Current Claims, Application No. 08756006.6 (3 pages).
State Intellectual Property Office of the People'S Republic of China, "Office Action", in application No. 2012053100922280, dated Jun. 5, 2012, 9 pages.
Current Claims in Application No. 2012053100922280, dated Jun. 2012, 3 pages.
State Intellectual Property Office of the People'S Republic of China, "$2^{nd}$ Office Action", in application No. 20080025521.5, dated Feb. 25, 2013, 11 pages.
Current Claims in Application No. 2012053100922280, dated Feb. 2013, 3 pages.

* cited by examiner

PROCESSING PACKET FLOWS

FIELD OF THE INVENTION

The present disclosure generally relates to network switching of packet flows.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

In networks, such as the internet, routers, switches, servers and other network elements process packets. One or more packets make up a flow. A flow is defined as a stream of one or more packets between a particular source and a particular destination and characterized by a specific set of parameters. Different parameters are used by different systems to define a flow. For example, certain processing logic in certain products of Cisco Systems, Inc. categorizes packets into flows called "NetFlows". In some cases, a NetFlow is a stream of packets that have the same source internet protocol (IP) address, destination IP address, source transmission control protocol (TCP)/user datagram protocol (UDP) port number, destination TCP/UDP port number, IP protocol type, IP type of service, and input logical interface. Thus, if two packets have the same characteristics described in the foregoing sentence, they are considered to be in the same NetFlow. However, other logic may categorize packets into flows by different characteristics. For example, certain logic uses a variation of factors to identify a flow with the following fields: source IP address, source TCP/UDP port number, destination TCP/UDP port number, IP protocol type, IP type of service, and input virtual local area network (VLAN).

Many network elements include a flow table, which stores information collected from all or some of the flows processed by the logic (including data on some or all of the specific packets in the flows). Information collected in certain flow tables may include, for example, the characteristics which define the flow (for example, those characteristics described above). Most (if not all) flow tables are limited in size and cannot store data on an infinite number of flows. Thus, generally, data in a flow table is sent periodically to a collector device or other collecting module for storage and/or use, and the flow table is reset so it can collect data on additional flows of packets. The data in a flow table may be utilized for many purposes, and the information in a flow table provides information about the characteristics of the network activities, for example, for use by a monitoring device or other module.

NetFlow information may be stored in NetFlow software or hardware modules managed by Cisco IOS Software, commercially available from Cisco Systems, Inc., San Jose, Calif.

Various malicious network activities, including port scanning and ICMP attacks, can be directly correlated to malware, hacker, worm or virus activity in a network. Detecting and preventing this malicious activity is extremely important to preserve the normal conditions of a network. Cisco network technology may be used to detect these attacks and to notify a central management device, which can take corrective action. However, in this approach, the reaction may not be prompt enough to mitigate the effects of the malicious activity in the network in a sufficiently timely manner. Further, most network systems have limited-size flow tables, therefore an attacker with an extensive and quick port scan sweep can generate so many new flows that the flow table can overflow and can temporarily lose important statistical data. Still further, in certain networks flow collectors or analyzers are not deployed, and proper reactive counter-measures are not planned or supported.

In some networks, to limit potential flow table utilization and flow data export issues, sampled (instead of continuous) flow collection is used. However, the higher the sampling ratio the longer it takes a security device to collect enough samples to identify a malicious activity. Therefore, using a high sampling ratio can cause delay in reacting to the malicious activity.

Similarly, a fully software-driven connection rate limiting technology can be used to achieve a certain degree of network protection, for example to throttle malicious virus activity. However, any such software-based scheme does often not scale well when applied to hardware-based systems and may not provide timely counter-actions to certain network threats.

BRIEF DESCRIPTION OF THE DRAWINGS

The present invention is illustrated by way of example, and not by way of limitation, in the figures of the accompanying drawings and in which like reference numerals refer to similar elements and in which.

DESCRIPTION OF EXAMPLE EMBODIMENTS

Figure 1:
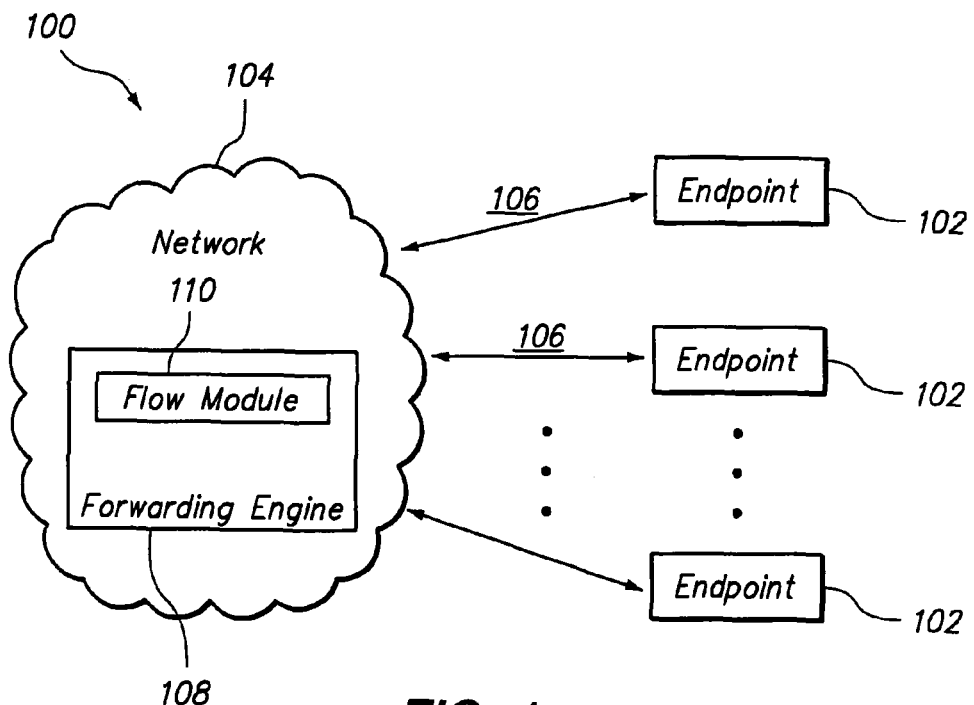
FIG. 1 illustrates an example system for packet flow processing.

Processing packet flows is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 Overview
2.0 Structural and Functional Overview
3.0 Additional Examples
4.0 Methods
    4.1 Flow Counting
    4.2 Packet Sampling
5.0 Implementation Mechanisms-Hardware Overview
6.0 Extensions and Alternatives

1.0 Overview

Processing packet flows is described. In one embodiment, a method includes determining an identifier associated with a packet. A flow count index is determined for the identifier and a flow counter is identified that indicates a number of flows associated with the flow count index. The example method also includes analyzing the packet to determine whether or not the packet is part of a new flow that has not been counted in the flow counter, and, if the packet is part of a new flow, the flow counter is incremented.

In another embodiment, a method includes determining an identifier associated with a packet. It also includes storing, in a flow table, statistics on some or all of the packets, wherein the frequency of sampling packets for the statistics is based on the identifier of the packet.

Another embodiment comprises an apparatus comprising a first logic configured to determine an identifier associated with a packet and determine a flow count index associated with the identifier. In addition, the example embodiment includes a flow counter coupled to the first logic and configured to count a number of flows associated with the flow count index. The example embodiment also includes a second logic, coupled to the first logic and the flow counter, wherein the second logic is configured to analyze the packet to determine if the packet is a part of a new flow that has not been counting in the flow counter, and if it has not been counted, incrementing the flow counter.

As another example, an embodiment comprises an apparatus comprising (a) a flow table comprising stored statistics regarding packets and (b) a first logic configured to determine an identifier associated with a packet. In addition, the example embodiment includes a second logic, coupled to the first logic and the flow table, wherein the second logic is configured to store, in the flow table, statistics on some or all of the packets, wherein the frequency of sampling packets for the statistics is based on the identifier of the packet.

2.0 Structural and Functional Overview

In one embodiment, a network device that is capable of collecting flow statistics also is capable of rate limiting the number of flows generated by certain hosts, so as to ensure fair utilization of its flow table(s). Restricting the creation of flows (and the related packet forwarding) can also be used to promptly limit port scan attacks and thereby constrain the spreading of worms before a proper reactive security policy can be applied by a centralized management device. Thus, embodiments described herein can be used in synergy with standard security policies, and can provide networking devices that enforce worm and virus containment over their directly attached hosts.

In an embodiment, a hardware-based mechanism enforces flow creation rate constraints on groups of end devices chosen through hardware policies. These hardware-enforced constraints can dynamically block the spreading of worms by blocking packets at wire speed without any software intervention.

Moreover, due to the aforementioned size limitations of the flow tables of hardware-based networking devices, embodiments can be used to allocate portions of the flow table in a fair manner among various users, so that no one user can monopolize the resources contained in the table and leave the other users with no space left for statistics. In an embodiment, a network manager may gather statistics in a fair manner from all users in the network, but may also configure policies (i.e., filters) to allow certain "main" users to have more flow space available while other less important users could get less or no space allocated to them.

In addition, when sampling is used, embodiments allow a flow implementation to collect samples on a per user basis so that each user is equally represented by the flow samples taken by the system.

A further application of an embodiment is the ability to police the number of flows directed to certain end devices to be protected (for example, servers or critical workstations). In general, it is more effective to apply flow based rate limiting at the source of an attack, rather than at its destination. However, source and destination flow rate limiting may work better when combined together.

Embodiments may be used with hardware-based, NP-based and even CPU-based forwarding engines. Embodiments are not limited to per-source-address or per-destination-address flow rate limiting and can be based on other parameters as well, such as protocol type (e.g., ICMP) and L4 ports, as explained herein.

FIG. 1 illustrates an example system 100 for processing packet flows. System 100 includes endpoints 102 that communicate with each other via network 104. In particular embodiments, network 104 is a local area network (LAN), a wireless LAN (WLAN), a wide area network (WAN), a metropolitan area network (MAN), a portion of the Internet, a portion of the Public Switched Telephone Network (PSTN), or another network 104 or a combination of two or more such networks 104. Any suitable network 104 may be used. One or more links 106 couple each of the endpoints 102 to network 104. In particular embodiments, the one or more links 106 comprise any of wireline, wireless, or optical links. In particular embodiments, the one or more links 106 comprise a LAN, a WLAN, a WAN, a MAN, a portion of the Internet, a portion of the PSTN, or another link 106 or a combination of two or more such links 106. System 100 can use any suitable links 106 coupling endpoint 102 to network 104.

In an embodiment, endpoints 102 are coupled to network 104 and may send packets to each other. For example, an endpoint 102 may include an analog or digital telephone, a telephone having voice over Internet Protocol (VoIP) capabilities, a mobile telephone (which may, but need not, have VoIP capabilities), a personal digital assistant (PDA), a computer system, or another endpoint 102 or a combination of two or more such endpoints 102. An endpoint 102 may be a notebook computer system capable of connecting to an LAN, a WLAN, or both. Any suitable endpoints 102 may be used.

Network 104 includes a forwarding engine 108. In addition, in particular embodiments, network 104 includes one or more network infrastructure devices, such as servers, routers, switches coupled to network 104. Network devices may perform any function and be used for any purpose. Network 104 may comprise any suitable network devices, including without limitation, any network devices that are endpoints.

In particular embodiments, forwarding engine 108 includes one or more elements that cooperate to provide packet forwarding functions. In particular embodiments, forwarding engine 108 is implemented in one or more components of hardware, software, or embedded logic, or a combination of two or more such components residing at one or more devices in network 104. In particular embodiments, forwarding engine 108 includes or has access to one or more databases, file systems, or storage devices capable of storing data.

Forwarding engine 108 passes packets from one device to another. Forwarding engine 108 may pass packets from one endpoint 102 to another endpoint 102, from one endpoint 102 to a network device as described above, or from a network device to another network device, or from a network device to an endpoint 102.

Forwarding engine 108 includes a flow module 110. In particular embodiments, flow module 110 comprises one or more components of hardware, software, or embedded logic or a combination of two or more such components providing packet flow processing functionality, as described below. In particular embodiments, flow module 110 is not in forwarding engine 108 but resides elsewhere in network 104. Although particular arrangements among a particular forwarding engine 108 and a particular flow module 110 are described and illustrated, any suitable arrangement among any suitable forwarding engine 108 and any suitable flow module 110 may be used.

In an example embodiment, endpoint 102 is a laptop computer which sends a message to network device, which is a software server. The message is sent in a flow through forwarding engine 108, and the packet is processed by flow module 110.

In an embodiment, forwarding engine 108 forms a part of a network infrastructure device such as a switch or a router. In an embodiment, forwarding engine 108 forms a part of one of the Catalyst packet data switches that are commercially available from Cisco Systems Inc. For example, the approach herein can be used in the Cisco Catalyst 6500, 29x0, 37x0 and 4500 switches.

Figure 2:
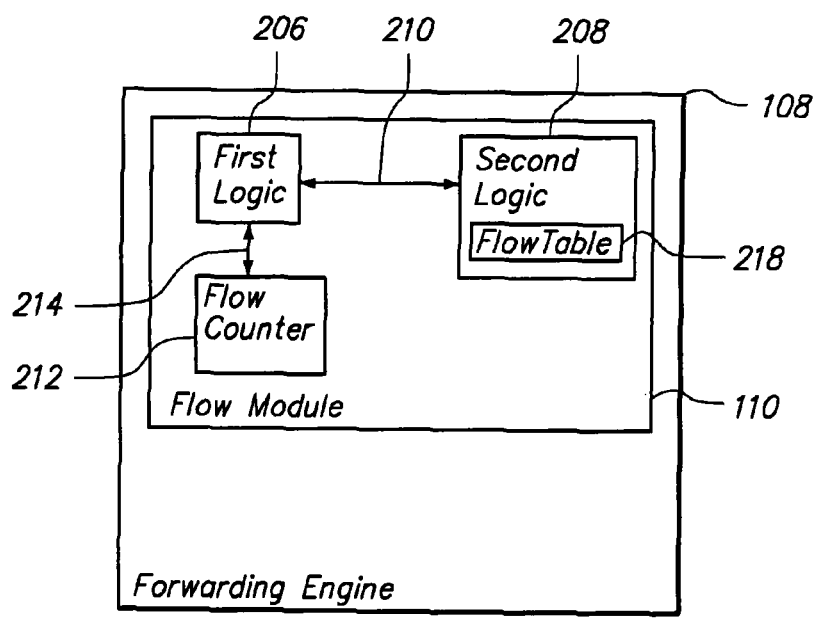
FIG. 2 illustrates an example embodiment for packet flow processing.

FIG. 2 illustrates an example embodiment of a forwarding engine 108. In example embodiments, forwarding engine 108 comprises a flow module 110. In example embodiments, forwarding engine 108 forms part of a switch, a router, or any other suitable device that passes packets. Forwarding engine 108 may include other modules; for example, forwarding engine 108 may include other logic that acts as packet filters.

In an embodiment, flow module 110 comprises a first logic 206 configured to determine an identifier associated with a packet and determine a flow count index associated with the identifier. In addition, flow module 110 comprises a flow counter 212 configured to count a number of packet flows associated with the flow count index and a second logic 208 configured to analyze the packet to determine if the packet is a part of a new packet flow that has not been counted in the flow counter, and increment the flow counter if the packet is part of a new packet flow. In certain embodiments, second logic 208 comprises a flow table 218, for collecting information about packet flows.

In particular embodiments, first logic 206 is a component of hardware, software, or embedded logic or a combination of two or more such components providing packet flow processing functionality, as described below, and second logic 208 is a component of hardware, software, or embedded logic or a combination of two or more such components providing packet flow analysis functionality, as described below. In particular embodiments, first logic 206, flow counter 212 and second logic 208 reside in forwarding engine 108. In particular embodiments, first logic 206, flow counter 212 and second logic 208 resides elsewhere in flow module 110. Although particular arrangements among a first logic 206, flow counter 212, second logic 208 and flow table 218 are described and illustrated, any suitable arrangement among any suitable first logic 206, flow counter 212, second logic 208 and flow table 218 may be used.

In particular embodiments, flow module 110 is a component of hardware, software, or embedded logic or a combination of two or more such components providing packet flow analysis functionality, as described below. In particular embodiments, flow module 110 resides at forwarding engine 108. In particular embodiments, flow module 110 resides elsewhere in network 104. Although particular arrangements among a particular forwarding engine 108 and a particular flow module 110 are described and illustrated, any suitable arrangement among any suitable forwarding engine 108 and any suitable flow module 110 may be used.

In an example embodiment, a forwarding engine 108 may receive packets from certain laptops and other devices. Packets are processed by flow module 110. In certain embodiments, first logic 206 is configured to perform a first pass over packet information to determine the IP address of the source of a packet (such as a laptop) and to determine a flow count index associated with the IP address for use in a flow counter 212. In some embodiments, the second logic 208 processes packet information in a second pass over the packet information, and is configured to determine whether or not the packet is a part of a new flow that has not already been counted in the flow counter 212 by looking up the packet in the flow table. If the packet is part of a new flow of packets, then the second logic 208 increments the flow count corresponding to the flow count index associated with applicable source IP address.

In certain embodiments, the first logic 206 is logic in an ASIC which analyzes packet information. In certain embodiments, the flow counter 212 comprises the flow count indices associated with the identifiers and the flow count of the packets with the identifier corresponding to the flow count index. For example, flow counter 212 may include no data or data on many flow count indices. Flow counter 212 may be a hash table, a register, an array or any other suitable data storage. Flow counter 212 may be part of the first logic 206 or can be separate logic or a partitioned portion of the flow table 218.

As described above, in particular embodiments, the identifier is the IP address for the source device of a packet. However, in other example embodiments, the identifier may be the destination IP address, source TCP/UDP port number, destination TCP/UDP port number, IP protocol type, IP type of service, input virtual local area network (VLAN) or any other suitable identifier of a packet, including without limitation a group of identifiers (such as a group of source devices) or any combination of identifiers. In some embodiments, the identifier may be configured by the user, for example through a command line interface (CLI).

For example, in some embodiments, a system administrator may have the option to configure the identifier. A system administrator, for example, may desire to protect a server from worms and viruses, and configure the identifier to be the destination IP address, in which case the number of flows are counted going to the particular destination IP addresses. In other embodiments, however, the flow identifier may be dynamically learned by the flow module 110, for example in flow logic 306. User-configurable policies can be employed to constrain and direct such dynamic learning process so as to properly select each learned identifier from the traffic being forwarded.

Second logic 208 is configured to analyze packets to determine if packets are part of a new flow that has not been counted in the flow counter 212, and to increment the flow counter 212 if the packet is part of a new flow. In particular embodiments, second logic 208 is NetFlow logic including a flow table 218 (which in some embodiments is a NetFlow table) for collection of detailed packet flow information. The characteristics of a packet used to determine the flow are the characteristics described above for network flows. In other embodiments, second logic 208 utilizes different characteristics to determine the flow of a packet.

In particular embodiments, once the number of flows associated with an identifier has exceeded a threshold, an event or responsive action occurs. For example, in some embodiments, the packet may be dropped, and/or a message may be sent to a monitoring device. Additional events and responsive actions are described below.

In particular embodiments, flow counter 212 may be decremented periodically. Thresholds may be based on the period between flow counter resets. For example, a network administrator may believe that certain desktops or laptops generally send no more than x number of flows per five seconds. Thus the network administrator may set the flow counter to be cleared every five seconds and the threshold for such desktops or laptops may be set at x. The thresholds and period for reset may be pre-configured in some embodiments or configured by a user or any other manner in some embodiments.

In some embodiments, flow table 218 comprises stored statistics regarding packets. First logic 206 may be configured to determine an identifier associated with a packet, such as the group of IP addresses that source of the packet may be a part of. Second logic 208 may be configured to store, in the flow table, statistics on a subset of the packets, where the frequency of sampling packets for the statistics is based on the identifier of the packet. Thus for some or all flows, information for only some packets may be stored in the flow table. For example, the source may be a high-priority source or a low priority source. For high priority sources, statistics for all packets may be stored. However, for low priority sources, statistics for none or infrequent packets may be stored.

The logic may be configurable by a user to determine the identifier and the rate of collection for particular identifiers or group of identifiers, thus a policy may be implemented in a dynamic manner. In addition, in some embodiments, the logic may be configured to store, in the flow table, only statistics on a subset of the packets, or to count the number of flows, or both. In some embodiments, the flow identifier may be dynamically learned by the flow module 110, for example in flow logic 306, and user-configurable policies can bind such identifier to a flow sampling rate and to the corresponding flow samples.

In addition, in some embodiments, flow table 218 may be partitioned into two or more portions. For example, one portion of flow table 218 may be used as the flow counter 212 and another portion to store the statistics of flows described above. Partitioning of flow table 218 is further discussed in relation to FIG. 5.

3.0 Additional Examples

Figure 3:
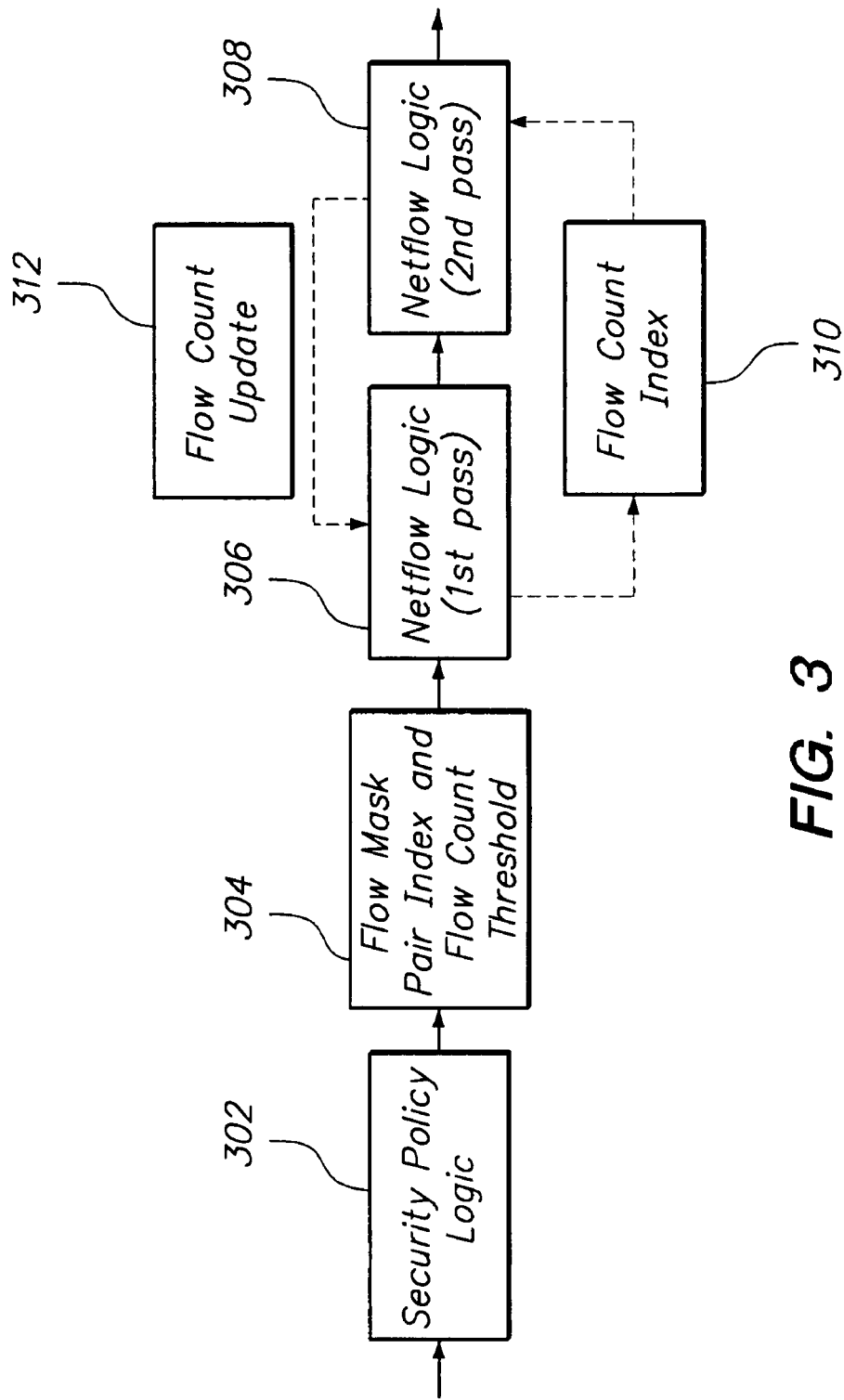
FIG. 3 illustrates an high level logical view of an example embodiment for packet flow processing.

FIG. 3 describes a high level logical view of an example embodiment of logical elements and data used in a forwarding engine. In the embodiment of FIG. 3, forwarding engine 108 comprises security policy logic 302, a flow mask pair index and flow count threshold 304, first pass NetFlow logic 306, second pass NetFlow logic 308, a flow count index 310, and a flow count update 312. A packet arriving at the forwarding engine 108 is passed through the security policy logic 302. Security policy logic 302 determines the packets for which features will be applied. In some embodiments, for example, security policy logic 302 may be a ternary content-addressable memory (TCAM). In other embodiments, other filters may be used such as software-based policy filters, specific commands specified by a user through the command line interface of a device that hosts the logic, or any other hardware-based filters, for example.

Flow mask pair index and flow count threshold 304 represents a pair of flow masks in some example embodiments. The flow masks specify which fields of the packet the features are to use. The flow count threshold is determined for each, all or some of the packets or may be determined by any other manner, such as configured by a user, and in some embodiments, is sent to the first pass NetFlow logic 306.

In particular embodiments, the flow count threshold and the event to occur, if any, if such threshold is exceeded are used by the first pass NetFlow logic 306 and second pass NetFlow logic 308. In particular embodiments, a packet is processed in two passes using first pass NetFlow logic 306 and second pass NetFlow logic 308. Particular embodiments may determine the number of flows from source devices, and perform an action if a certain number of flows are received from a particular source device. A large number of packet flows from a single source device may indicate suspicious activity such as a port scan or a virus, and the action may be to drop the packet, for example.

In certain embodiments, for example, the first pass NetFlow logic 306 determines the source IP address of packets, and identifies a flow count index 310 for each source IP address, which such index indicates in some embodiments a location in a hash table. The location of the hash table stores a flow count, which is incremented when a packet in a new flow is received from a device with an IP address corresponding with the location in the hash table.

The second pass NetFlow logic 308 determines if the packet is from a new flow, or is part of a flow which has already been counted. If the packet is from a new flow, the NetFlow logic updates (312) accordingly the flow count in the hash table corresponding to the location for the applicable source device. In certain embodiments, the NetFlow logic 308 may be collecting additional information about the packets and flows in a NetFlow table.

If the flow counter exceeds a threshold, the NetFlow logic 306 may trigger an event to occur. For example, if the threshold of the flows counted from a particular source device is exceeded, packets from such device may be dropped or ignored. In addition, a copy of a packet or other notification may be sent to another device or CPU.

Figure 4:
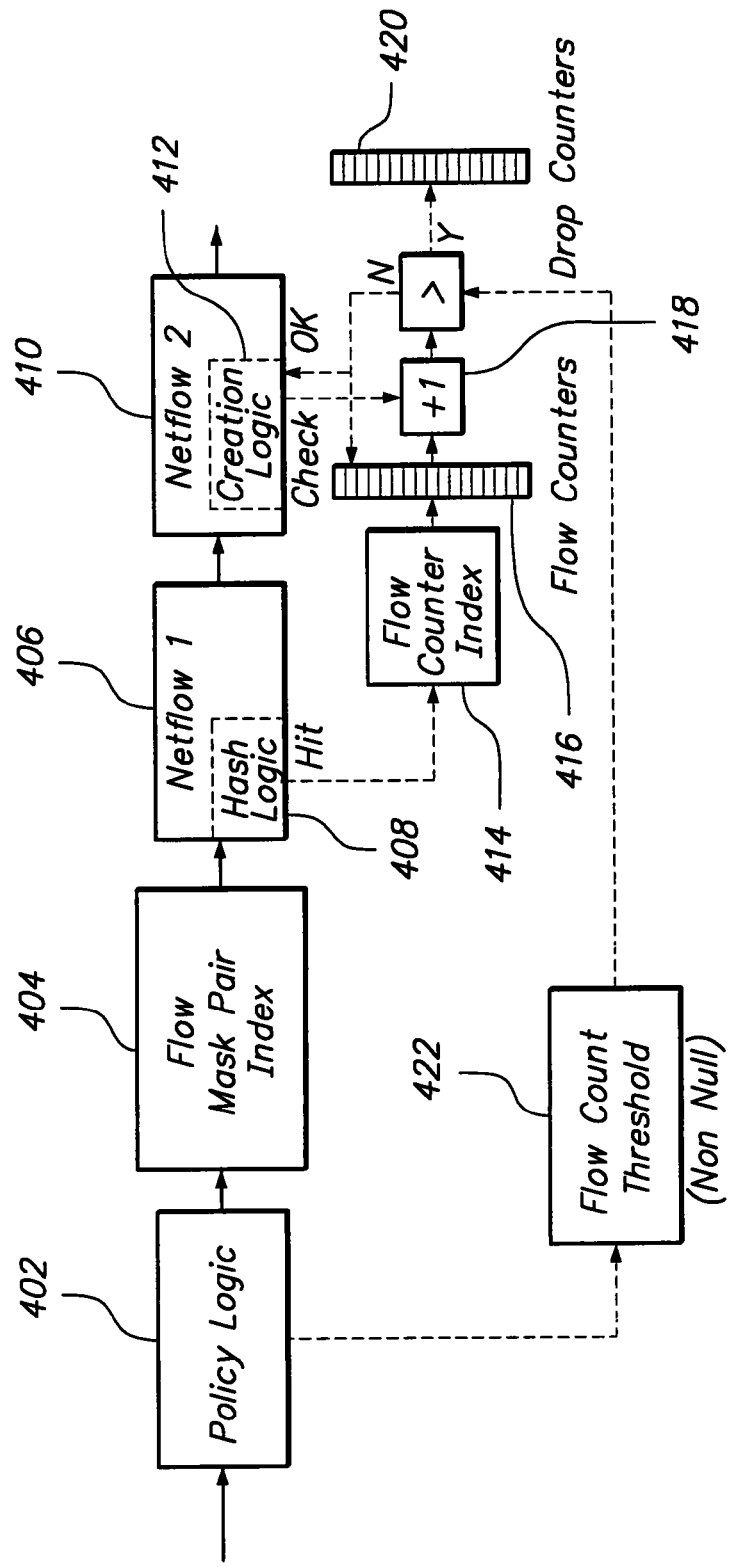
FIG. 4 illustrates an another high level logical view of an example embodiment for packet flow processing.

FIG. 4 describes another example embodiment that determines the flow of a packet using the NetFlow characteristics described above. A packet is processed by 402 and 404. In certain embodiments, NetFlow 1 logic 406 includes hash logic 408. NetFlow logic 406 is configured to determine an identifier associated with a packet and determine a flow count index 414 associated with the identifier. In addition, the example embodiment includes a flow counter 416 coupled to the NetFlow logic 406 and configured to count a number of NetFlows associated with the flow count index. The example embodiment also includes a second NetFlow logic 410, which includes creation logic 412 in this embodiment, wherein the second logic 412 is configured to analyze the packet to determine if the packet is part of a new NetFlow that has not been counted in the corresponding flow counter 416. In certain embodiments, if the NetFlow has not been counted, the flow counter 416 is incremented at 418.

In particular embodiments, NetFlow 2 logic 410 is configured to determine whether the number of NetFlows associated with the identifier has exceeded a threshold. If the threshold has not been exceeded, the NetFlow 2 logic 410 updates the NetFlow table with statistics for the packet. Alternatively, an event may be triggered when the number of flows has exceeded the threshold. In certain embodiments, the threshold 422 is passed to the NetFlow logic and used by the NetFlow logic. In other embodiments, the threshold 422 may be pre-configured or it may be configured by a user (for example, through user-configured static policies that can be port-based, interface-based, policy-based, etc.) or may be determined in any manner.

In some embodiments, the event that occurs if the number of flows has exceeded the threshold is to drop the packet. In some such embodiments, a drop counter 420 is incremented to track the number of packets dropped. In addition, the event may include other events such as notifying a CPU or other device. The event can be one or more suitable events. Further examples are described below.

Figure 5:
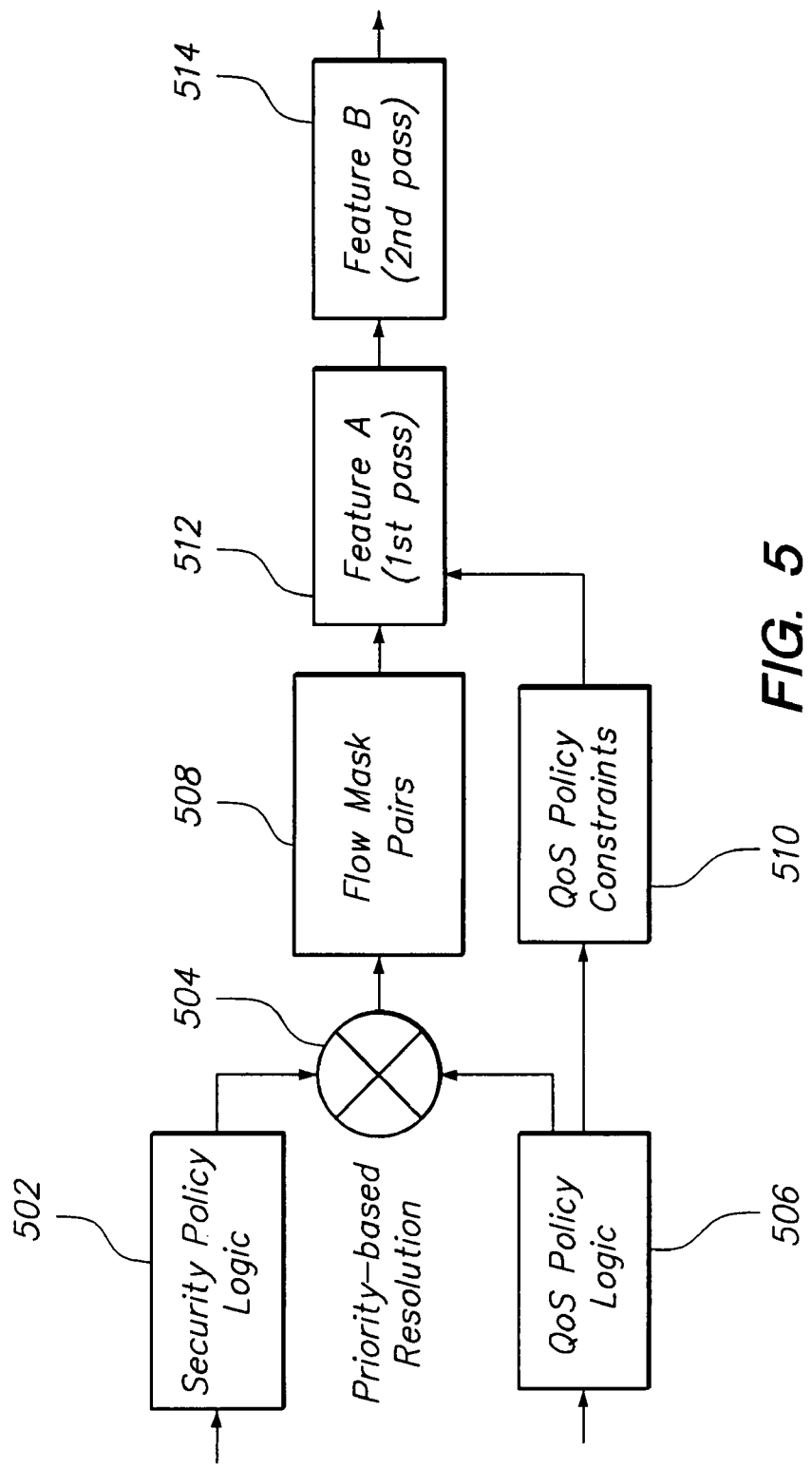
FIG. 5 illustrates an high level logical view of features that may utilize packet flow processing.

FIG. 5 is example overview of an embodiment where mutually exclusive features co-exist in the same logic. One such feature is described in the above paragraphs. In particular embodiments, for example, a flow table may be partitioned into two or more portions, allowing different features to use the same table.

For example, FIG. 5 displays two additional features, Feature A 512 and Feature B 514, which may use the same flow table, provided the table is partitioned. User Based Rate Limiting (UBRL) and NetFlow Data Export (NDE) are two examples of features that may be used as Feature A or Feature B. In the UBRL feature, for example, a packet is passed through only if it meets a simple criterion. With NDE, more criteria are used, utilizing different tables or partitioned tables. In addition, tables can be further partitioned for additional features.

FIG. 5 illustrates an embodiment in which a packet is processed by Security Policy Logic 502 or Quality of Service (QoS) Policy Logic 506. Packets processed by Security Policy Logic 502 are passed to the feature based on a priority-based resolution of 504. Packets are assigned an index based on 508 and 510 and passed to any feature logic represented by Feature A 512 and Feature B 514, such as UBRL and NDE.

3.0 Methods

3.1 Flow Counting

Figure 6:
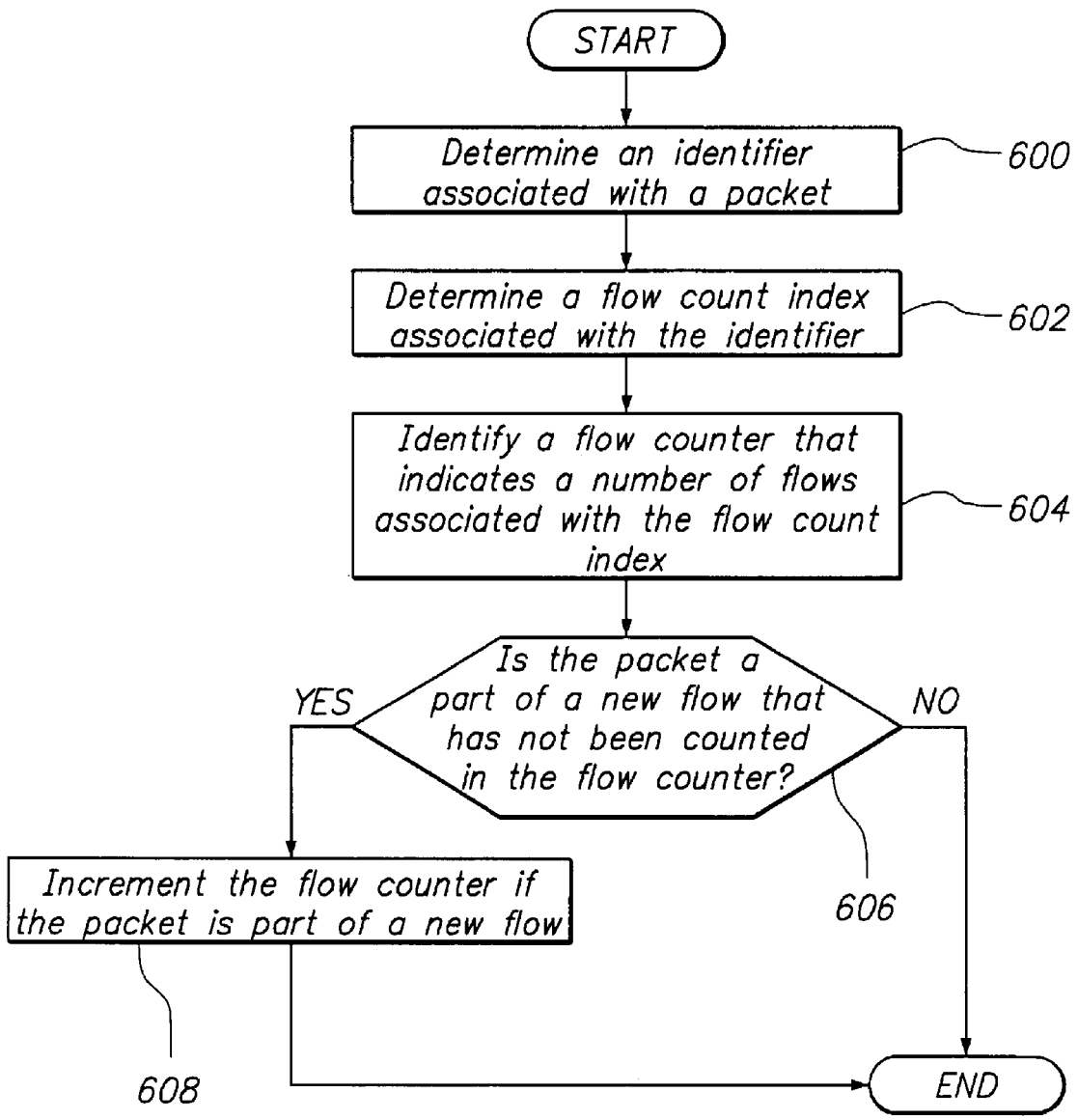
FIG. 6 illustrates an example method for packet flow analysis.

FIG. 6 illustrates an example method for processing packet flows. The method begins at step 600, where an identifier associated with a packet is identified. For example, a packet may travel from a desktop or laptop device over the internet to another device. In a sample embodiment, the identifier may be the IP address of the source device for the packet. If a large number of flows originate from an end device, this may indicate a port scan resulting, for example, from a worm or virus or other security breach. However, this method may be practiced for any number of reasons.

At step 602, a flow count index associated with the identifier is determined and, at step 604, a flow counter is identified that indicates a number of flows associated with the flow count index. In certain embodiments, the flow count index identifies a location of the flow counter that indicates the number of flows associated with the destination device for the packet.

At step 604, the packet is analyzed to determine whether or not the packet is part of a new flow that has not been counted in the flow counter, and, at step 606, if the packet is part of the new flow that has not been counted in the flow counter associated with the source IP address, the flow counter is incremented. If the packet is not part of a new flow, the flow counter is not incremented. The source device described above may send a message to another device, and the packet in question is part of a flow of packets making up the message. If a packet has already been analyzed and the flow has already been counted, the flow counter will not be incremented, for the flow has already been counted. However, if the packet is the first packet analyzed, the flow counter associated with IP address for the source laptop will be incremented.

Figure 7:
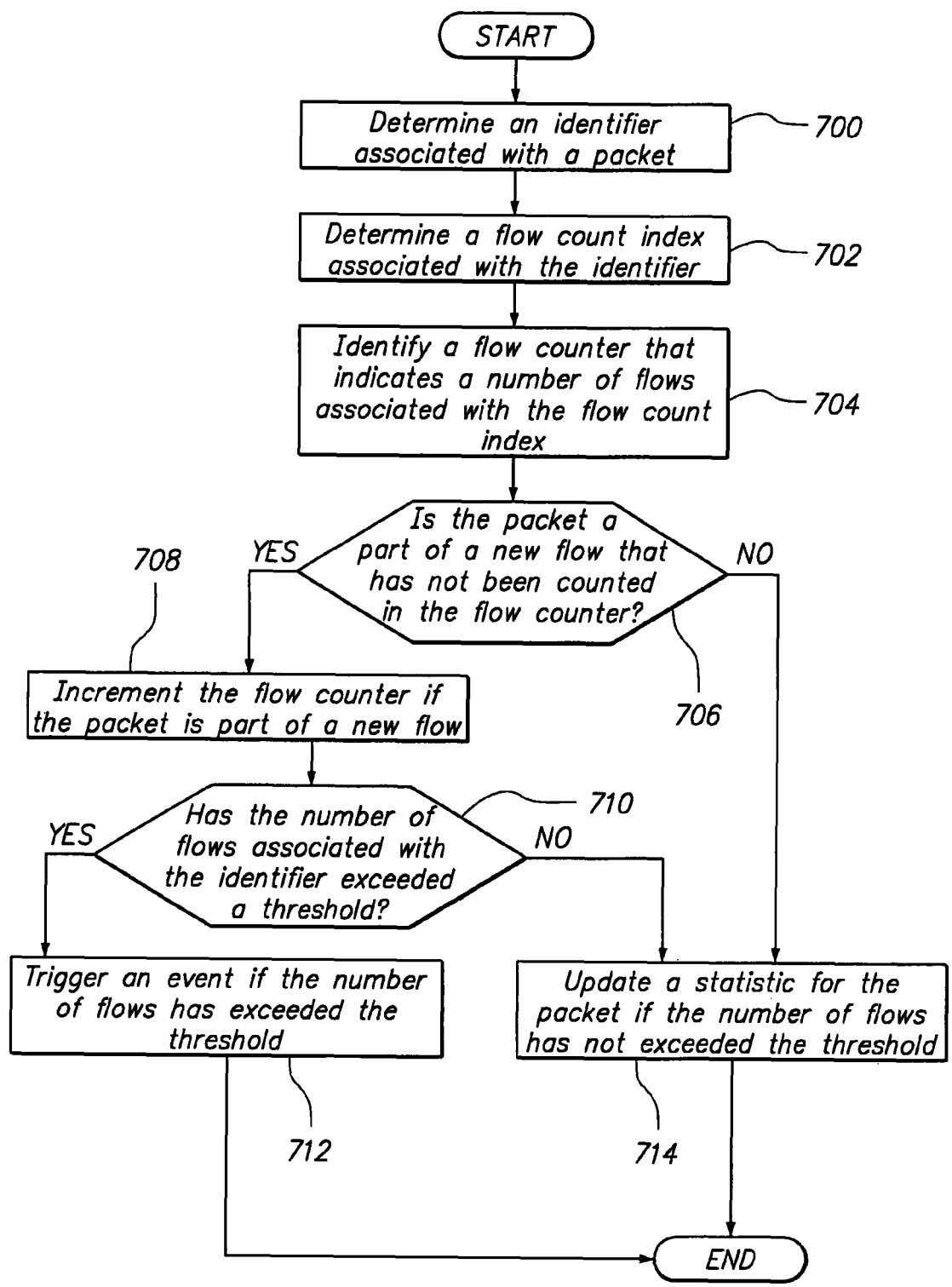
FIG. 7 illustrates an another example method for packet flow analysis.

FIG. 7 illustrates another example method for processing flows. The method begins at step 700, where an identifier associated with a packet is identified. For example, a packet may be sent from a client device over the internet to a web server. In a sample embodiment, the identifier may be the IP address of the web server.

At step 702, a flow count index associated with the identifier is determined and, at step 704, a flow counter is identified that indicates a number of flows associated with the flow count index. In certain embodiments, the flow count index identifies a location of the flow counter that indicates the number of flows associated with the destination device for the packet.

At step 706, the packet is analyzed to determine whether or not the packet is part of a new flow that has not been counted in the flow counter, and, at step 708, if the packet is part of the new flow that has not been counted in the flow counter associated with the destination IP address, the flow counter is incremented. If the packet is not part of a new flow, the flow counter is not incremented. For example, the client device described above may have sent a flow of packets to a web server, for example, and the packet in question is part of such flow. If a previous packet in the same flow has been analyzed, detailed information from a previous packet may have been stored and the flow already counted by incrementing the flow counter for the flow, the flow counter will not be incremented for other packets in the same flow, for the flow has already been counted. However, if the packet is the first packet analyzed, the flow counter associated with IP address for the server will be incremented.

At step 710, it is determined whether the number of flows associated with the identifier has exceeded a threshold. At step 714, if the threshold has not been exceeded, the statistic for the packet is updated, for example, in a flow table. Alternatively, at step 712, an event may be triggered when the number of flows has exceeded the threshold. For example, a threshold number of flows destined for a particular device may have been set, for example, to protect against denial-of-service attacks. If the number of flows associated with the web server has not exceeded the threshold, statistics for the packet are saved in a flow table and passed on. However, if the threshold has been exceeded, statistics may not be saved and the packet may be dropped.

In particular example embodiments, if the threshold has been exceeded, an event may be triggered. The event may be one or more events. The event may comprise passing a packet through and do nothing. In some embodiments, the event may be dropping a packet, passing a packet through, doing nothing, dropping a packet and incrementing a drop packet counter, notifying another device of a packet, sending a copy of a packet to the central processing unit or other monitor or module, or any other suitable event.

In particular example embodiments, updating a statistic for the packet is inserting data from the packet in a flow table. The data in the flow table, for example, may be used, for among other things, to determine if a next packet is from a flow that has already been counted.

In particular embodiments, an example method may also comprise resetting the flow counter. The resetting may occur periodically or at set times.

3.2 Flow Sampling

In another embodiment, a method includes determining an identifier associated with a packet. It also includes storing, in a flow table, statistics on a subset of the packets, wherein the frequency of sampling packets for the statistics is based on the identifier of the packet. For example, in an embodiment, the source IP address of a packet is determined. For example, the frequency of packets to store packet statistics is determined by the source IP address. For example, the data of 1 out of x packets may be stored in the flow table.

4.0 Implementation Mechanisms

Hardware Overview

Figure 8:
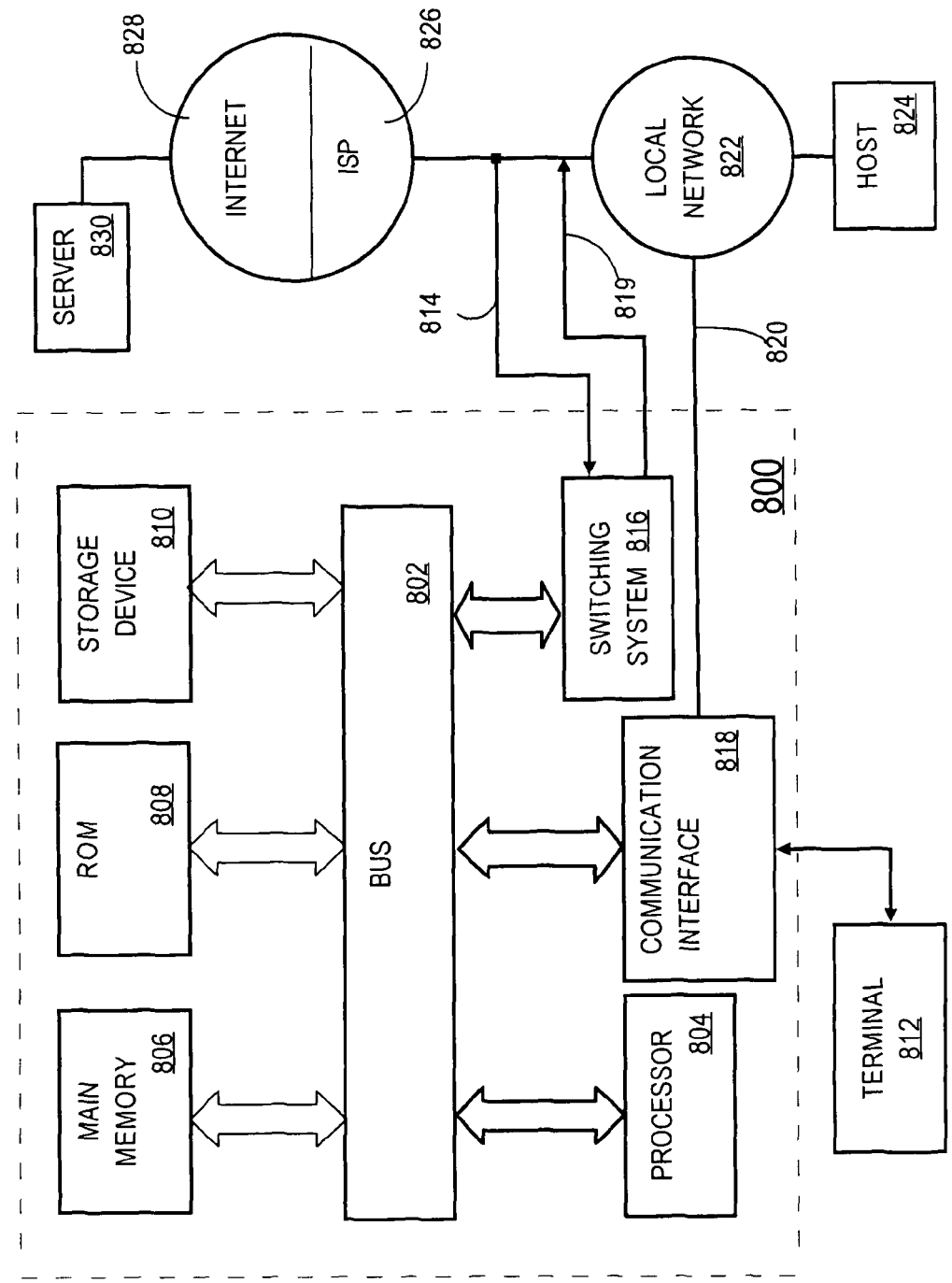
FIG. 8 illustrates a computer system upon which an embodiment may be implemented.

FIG. 8 is a block diagram that illustrates a computer system 800 upon which an embodiment of the invention may be implemented. An embodiment is implemented using one or more computer programs running on a network element such as a router device. Thus, in this example embodiment, the computer system 800 is a router.

Computer system 800 includes a bus 802 or other communication mechanism for communicating information, and a processor 804 coupled with bus 802 for processing information. Computer system 800 also includes a main memory 806, such as a random access memory (RAM), flash memory, or other dynamic storage device, coupled to bus 802 for storing information and instructions to be executed by processor 804. Main memory 806 also may be used for storing temporary variables or other intermediate information during execution of instructions to be executed by processor 804. Computer system 800 further includes a read only memory (ROM) 808 or other static storage device coupled to bus 802 for storing static information and instructions for processor 804. A storage device 810, such as a magnetic disk, flash memory or optical disk, is provided and coupled to bus 802 for storing information and instructions.

A communication interface 818 may be coupled to bus 802 for communicating information and command selections to processor 804. Interface 818 is a conventional serial interface such as an RS-232 or RS-422 interface. An external terminal 812 or other computer system connects to the computer system 800 and provides commands to it using the interface 814. Firmware or software running in the computer system 800 provides a terminal interface or character-based command interface so that external commands can be given to the computer system.

A switching system 816 is coupled to bus 802 and has an input interface 814 and an output interface 819 to one or more external network elements. The external network elements may include a local network 822 coupled to one or more hosts 824, or a global network such as Internet 828 having one or more servers 830. The switching system 816 switches information traffic arriving on input interface 814 to output interface 819 according to pre-determined protocols and conventions that are well known. For example, switching system 816, in cooperation with processor 804, can determine a destination of a packet of data arriving on input interface 814 and send it to the correct destination using output interface 819. The destinations may include host 824, server 830, other end stations, or other routing and switching devices in local network 822 or Internet 828.

The invention is related to the use of computer system 800 for analyzing packet flows. According to one embodiment of the invention, processing flows of packets are provided by computer system 800 in response to processor 804 executing one or more sequences of one or more instructions contained in main memory 806. Such instructions may be read into main memory 806 from another computer-readable medium, such as storage device 810. Execution of the sequences of instructions contained in main memory 806 causes processor 804 to perform the process steps described herein. One or more processors in a multi-processing arrangement may also be employed to execute the sequences of instructions contained in main memory 806. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 804 for execution. Such a medium may take many forms, including but not limited to, non-volatile media, volatile media, and transmission media. Non-volatile media includes, for example, optical or magnetic disks, such as storage device 810. Volatile media includes dynamic memory, such as main memory 806. Transmission media includes coaxial cables, copper wire and fiber optics, including the wires that comprise bus 802. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 804 for execution. For example, the instructions may initially be carried on a magnetic disk of a remote computer. The remote computer can load the instructions into its dynamic memory and send the instructions over a telephone line using a modem. A modem local to computer system 800 can receive the data on the telephone line and use an infrared transmitter to convert the data to an infrared signal. An infrared detector coupled to bus 802 can receive the data carried in the infrared signal and place the data on bus 802. Bus 802 carries the data to main memory 806, from which processor 804 retrieves and executes the instructions. The instructions received by main memory 806 may optionally be stored on storage device 810 either before or after execution by processor 804.

Communication interface 818 also provides a two-way data communication coupling to a network link 820 that is connected to a local network 822. For example, communication interface 818 may be an integrated services digital network (ISDN) card or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are exemplary forms of carrier waves transporting the information.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818. In accordance with the invention, one such downloaded application provides for processing flows of packets as described herein.

The received code may be executed by processor 804 as it is received, and/or stored in storage device 810, or other non-volatile storage for later execution. In this manner, computer system 800 may obtain application code in the form of a carrier wave.

5.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

In summary, an embodiment: applies to any IP flow, bridged or routed (but can be extended to be based on MAC addresses, if need be); can be performed fully in hardware with no software involvement during the flow forwarding process; can be controlled by a granular hardware policy that can choose whether to do flow rate limiting on a per source basis (worm containment) or on a per destination basis (e.g., for server protection), what number of flows to allow per address, and the type of (combined) actions to enforce: constrain flow creation, drop out-of-policy packets, generate interrupt notifications to the CPU, choose the flow sampling rate (i.e., 1-out-of-N flows to be sampled), etc.; protects the network and the network resources by constraining the number of flows that a source can generate each second (or other configurable period of time); additionally, protects heavily-used destinations (such as servers) by limiting the number of connections that can be opened toward them in a predetermined period of time (this limit can be empirically determined based on the maximum processing power and available memory of the protected devices).

An embodiment is novel at least in part because: it can police the creation rate of flows, routed or bridged, in hardware without requiring any software intervention during the forwarding process (and software-based implementations can benefit from the techniques herein as well); it can limit the number of flows based on source addresses and/or destination addresses; it can also be extended to use MAC addresses, protocol types or even L4 ports, if need be (an example of L4 port use would be for application-specific destination-based flow rate limiting); it can safeguard NetFlow implementations from attacks aimed at exhausting the resources of the NetFlow table and therefore cause overflows and loss of statistics (for this application, the feature can be used in software-only implementations as well).

An embodiment allows a networking device to limit the number of flows that an end host can generate in a predetermined period of time, to protect other end devices from the spreading of worms and to control the utilization of the NetFlow tables to avoid potential overflow issues. Policies can also be used to selectively collect fewer flow samples from devices considered less critical.

An embodiment allows a networking device to promptly rate limit the number of flows that a malicious user or piece of software can generate, before a traffic analysis tool can analyze the traffic and apply the proper network-wide countermeasures. Therefore an embodiment is synergic with the existing solutions, and not mutually exclusive with them. An embodiment has the capability of being fully hardware-enabled, applicability to any bridged or routed connection, a high degree of policy-based granularity and its support for per-user flow sampling ratios of the 1:N type.

What is claimed is:

1. An apparatus comprising:
   a first logic configured to determine an identifier associated with a packet and a flow count index associated with the identifier;
   a flow counter coupled to the first logic and configured to count a number of flows associated with the flow count index, wherein the flow counter comprises one or more flow count indices associated with one or more identifiers and flow counts corresponding to respective one or more flow count indices;
   a second logic, coupled to the first logic and the flow counter, wherein the second logic is configured to analyze the packet to determine if the packet is a part of a new flow that has not been counted in the flow counter, and increment the flow counter if the packet is part of a new flow;
   wherein the second logic increments the flow counter by incrementing a flow count corresponding to the flow count index associated with the identifier;
   a flow table coupled to the second logic and comprising stored statistics on packets, wherein said packets are sampled at a flow sampling rate determined by a priority is bound to a source identifier of the packet;
   wherein the flow sampling rate causes a greater number of statistics to be stored for a high-priority source than for a lower priority source.

2. The apparatus of claim 1, wherein flows are a stream of packets between a particular source and a particular destination and characterized by a specific set of parameters.

3. The apparatus of claim 2, wherein the set of parameters comprises IP protocol type, IP type of service, input logical interface.

4. The apparatus in claim 1, wherein the second logic is further configured to:
   determine whether the flow count has exceeded a threshold;
   update a statistic for the first packet in the flow table when the flow count has not exceeded the threshold;
   trigger an event when the flow count has exceeded the threshold.

5. The apparatus in claim 4 wherein the second logic is further configured to reset the flow count.

6. The apparatus in claim 4 wherein the event comprises not updating a statistic for the packet in the flow table and passing the packet.

7. The apparatus in claim 4 wherein the event comprises dropping the packet.

8. The apparatus in claim 7, further comprising a drop counter that is configured to count the number of packets dropped.

9. The apparatus of claim 1, wherein the identifier is configurable.

10. The apparatus in claim 1 wherein the identifier is an internet protocol address of the source of the packet.

11. The apparatus in claim 1 wherein the flow counter is a hash table in the first logic.

12. The apparatus of claim 1,
wherein the second logic is configured to sample packets of a first flow at a first sampling rate based on a first source identifier of a packet associated with the first flow;
wherein the second logic is configured to sample packets of a second flow at a second sampling rate based on a second source identifier of a packet associated with the second flow;
wherein the first sampling rate is different than the second sampling rate.

13. A method comprising the computer-implemented steps of:
determining an identifier associated with a packet and a flow count index associated with the identifier;
identifying a flow counter that indicates a number of flows associated with the flow count index, wherein the flow counter comprises one or more flow count indices associated with one or more identifiers and flow counts corresponding to respective one or more flow count indices;
analyzing the packet to determine when the packet is a part of a new flow that has not been counted in the flow counter;
incrementing the flow counter when the packet is part of a new flow;
wherein incrementing the flow counter comprises incrementing the flow counts corresponding to the one or more flow count indices associated with the identifier;
storing statistics on packets, wherein the packets are sampled at a flow sampling rate determined by a priority that is bound to a source identifier of the packet;
wherein the flow sampling rate causes a greater number of statistics to be stored for a high-priority source than for a lower priority source;
wherein the method is performed by one or more computing devices.

14. The method of claim 13, wherein determining an identifier associated with a packet is performed in one or more electronic circuits.

15. The method of claim 13, where the identifier identifies a group of source devices from which the packet originated.

16. The method of claim 13, further comprising the computer-implemented steps of:
determining whether the number of flows associated with the identifier has exceeded a threshold;
updating a statistic for the packet when the number of flows has not exceeded the threshold;
triggering an event when the number of flows has exceeded the threshold.

17. The method of claim 16, wherein the event comprises dropping the packet.

18. The method of claim 17, further comprising storing statistics of the dropped packet.

19. The method of claim 13, further comprising:
sampling packets of a first flow at a first sampling rate based on a first source identifier of a packet associated with the first flow;
sampling packets of a second flow at a second sampling rate based on a second source identifier of a packet associated with the second flow;
wherein the first sampling rate is different than the second sampling rate.

20. A system comprising:
means for determining an identifier associated with a packet;
means for determining a flow count index associated with the identifier;
means for identifying a flow counter that indicates a number of flows associated with the flow count index, wherein the flow counter comprises one or more flow count indices associated with one or more identifiers and flow counts corresponding to respective one or more flow count indices;
means for analyzing the packet to determine when the packet is a part of a new flow that has not been counted in the flow counter;
means for incrementing the flow counter when the packet is part of a new flow;
wherein incrementing the flow counter comprises incrementing the flow counts corresponding to the one or more flow count indices associated with the identifier;
means for storing statistics on packets, wherein the packets are sampled at a flow sampling rate determined by a priority that is bound to a source identifier of the packet;
wherein the flow sampling rate causes a greater number of statistics to be stored for a high-priority source than for a lower priority source.

21. The system of claim 20, wherein the means for determining an identifier associated with a packet comprises one or more electronic circuits.

22. The system of claim 20, wherein the identifier identifies a group of source devices from which the packet originated.

23. The system of claim 20, further comprising:
means for determining whether the number of flows associated with the identifier has exceeded a threshold;
means for updating a statistic for the packet when the number of flows has not exceeded the threshold;
means for triggering an event when the number of flows has exceeded the threshold.

24. The system of claim 23, wherein the event comprises dropping the packet.

25. The system of claim 24, further comprising means for storing statistics of the dropped packet.

* * * * *